United States Patent Office 3,835,096
Patented Sept. 10, 1974

3,835,096
LIGHT DEGRADABLE THERMOPLASTIC MOLDING COMPOSITION BASED ON POLYACETALS
Harald Cherdron, Naurod, Taunus, Edgar Fischer, Frankfurt am Main, and Karl Friedrich Mück, Wiesbaden, Germany, assignors to Farbwerke Hoechst Aktiengesellschaft vormals Meister Lucius & Bruning, Frankfurt am Main, Germany
No Drawing. Filed Sept. 14, 1972, Ser. No. 289,182
Claims priority, application Germany, Sept. 16, 1971, P 21 46 374.1
Int. Cl. C08g 1/02
U.S. Cl. 260—67 FP  7 Claims

ABSTRACT OF THE DISCLOSURE

Polyacetals, i.e. homopolymers of formaldehyde or of trioxane or copolymers of trioxane with monofunctionally reacting compounds such as cyclic ethers or cyclic acetals and possibly polyfunctionally reacting compounds can be protected by addition of stabilizers against the action of heat and oxygen. They can, however, be degraded by the action of ultra-violet light if they contain light sensitizers, for example anthrone. The polyacetals are suitable for the manufacture of shaped articles, especially sheets.

---

The present invention relates to a light degradable thermoplastic molding composition based on polyacetals.

It is known that homopolymers of trioxane or of formaldehyde with esterified or etherified terminal groups and copolymers of trioxane and small quantities of cyclic formals or cyclic ethers can be protected against the action of heat, oxygen and light by adding stabilizers. Suitable heat stabilizers are for example polyamides, amides of polybasic carboxylic acids, amidines, hydrazines, ureas and poly(N-vinyl-lactams). As oxidation stabilizers phenols, especially bisphenols, and aromatic amines are used whilst the derivatives of alpha-hydroxybenzophenone and of benzotriazole serve as stabilizers against the action of light. The stabilizers are generally used in total amounts of from 0.1 to 10, preferably 0.5 to 5% by weight calculated on the total mixture.

The products obtained after stabilization are characterized by excellent working properties and durability; the latter property may, however, cause difficult problems in view of the fight against pollution. Therefore, it is desirable to produce poly(oxymethylenes) with the same good working properties we know already, which are, however, less resistant to the action of ultra-violet light, to which they are exposed when deposited in the open air.

Object of the present invention is a thermoplastic molding composition which degrades in ultra-violet light and substantially consists of a mixture of from (a) 99.9 to 90% by weight of an oxymethylene polymer, and
(b) From 0.1 to 10% by weight of a mixture consisting of 10 to 30% by weight of one of the known heat stabilizers and
90 to 70% by weight of anthrone. Thus the molding composition may contain from 0.07 to 9% of anthrone, based on the total weight of the composition.

As oxymethylene polymers there may be used either homopolymers of formaldehyde or of trioxane or copolymers of trioxane and a cyclic ether or a cyclic formal differing from trioxane or a linear polyacetal; or terpolymers of trioxane, a cyclic ether or a cyclic formal differing from trioxane and a polyfunctionally reacting compound.

The portion of homo-, co- or terpolymer of trioxane in the molding composition of the invention is preferably from 99.5 to 95% by weight, whilst the portion made up of the heat stabilizer and anthrone is preferably from 0.5 to 5% by weight. Those molding compositions show particularly good properties which consist of from 99.5 to 98% by weight of a homo-, co- or terpolymer and from 0.5 to 2% by weight of a mixture of a stabilizer and a sensitizer.

By homopolymers of formaldehyde or trioxane we mean to include those polymers of which the terminal hydroxy groups have been chemically stabilized against degradation, for example by esterification or etherification.

When using copolymers there are employed as comonomers cyclic ethers and cyclic formals differing from trioxane and of the formula I I 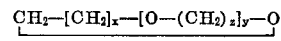

In this formula $x$ is either an integer of from 1 to 3 and $y$ is zero, or
$x$ is zero, $y$ is an integer of from 1 to 3 and $z$ is 2, or
$x$ is zero, $y$ is 1 and $z$ is an integer of from 3 to 6, preferably 3 or 4.

As cyclic ethers there are suitable above all those containing 3 ring members, for example ethylene oxide, styrene oxide, propylene oxide and epichlorohydrin as well as phenylglycidyl ether.

As cyclic formals there are suitable mainly cyclic formals of aliphatic or cyclo-aliphatic alpha, omega-diols having from 2 to 8, preferably from 2 to 4 carbon atoms, the carbon chain of which may be interrupted by an oxygen atom at intervals of 2 carbon atoms, e.g. glycol formal (1,3-dioxolane), butanediol formal (1,3-dioxepane) and diglycol formal (1,3,6-trioxocane) as well as 4-chloromethyl-1,3-dioxolane and hexanediol formal (1,3 dioxonane).

Equally suitable are copolymers of trioxane with linear polyacetals.

By linear polyacetals we mean to include both homo- or copolymers of the cyclic acetals as defined above, as well as linear condensates of aliphatic or cyclo-aliphatic alpha,omega-diols with aliphatic aldehydes or thio-aldehydes, preferably formaldehyde. Especially useful are homopolymers of linear formals of aliphatic alpha,omega-diols having from 2 to 8, preferably from 2 to 4 carbon atoms, for example poly(dioxolane) and poly(dioxepane).

Cyclic ethers or cyclic formals differing from trioxane or linear polyacetals are employed as comonomers or co-components preferably in quantities of from 1 to 5% by weight, calculated on the total amount of components to be polymerized.

When using terpolymers the cyclic ethers or cyclic formals differing from trioxane specified above are employed preferably in quantities of from 0.5 to 2% by weight. Of the polyfunctional compounds generally a quantity of from 0.01 to 5, preferably 0.05 to 2% by weight is used. As polyfunctionally reacting compounds there are employed mainly alkylglycidyl formals, polyglycoldiglycidyl ethers, alkanedioldiglycidyl ethers and bis(alkanetriol)-triformals.

By alkylglycidyl formals we mean to include compounds of formula II

II 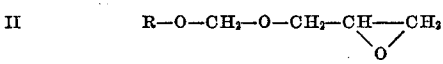

in which R means an aliphatic alkyl radical having 1 to 10, preferably 1 to 5 carbon atoms. Particularly suitable are alkylglycidyl formals of the above formula in which R represents a linear aliphatic alkyl radical of low molecular weight, e.g. methylglycidyl formal, ethylglycidyl formal, propylglycidyl formal and butylglycidyl formal.

As polyglycoldiglycidyl ethers compounds of formula III are suitable.

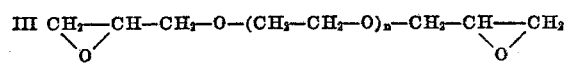

in which n represents an integer of from 2 to 5. Particularly suitable are polyglycoldiglycidyl ethers of the above formula, wherein n is 2 or 3, for example diethyleneglycol-diglycidyl ether and tri-ethyleneglycol-diglycidyl ether.

As alkanedioldiglycidyl ethers compounds of formula IV are suitable.

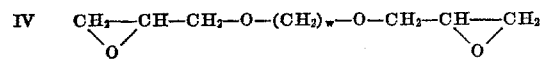

wherein w is an integer of from 2 to 6, preferably 2 to 4. Especially suitable is butanedioldiglycidyl ether.

By bis(alkanetriol)-triformals we mean to inclue compounds with one linear and two cyclic formals groups, especially compounds of formula V

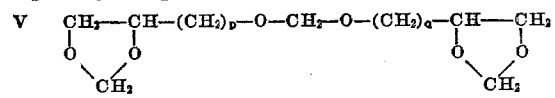

wherein p and q represent each an integer of from 3 to 9, preferably 3 or 4. Particularly suitable are symmetrical bis(alkanetriol) formals of the above formula, in which p and q are equal, for example bis(1,2,5-pentanetriol) triformal and preferably bis(1,2,6-hexanetriol) triformal.

The homopolymers of formaldehyde or of trioxane used for the molding composition of the present invention are obtained, in known manner, by catalytic polymerization of the monomer (cf. German Auslegeschrift 1,037,705 and German Pat. 1,137,215). The copolymers or terpolymers of trioxane used for the molding composition of the invention can be equally obtained, in known manner by polymerizing the monomers in the presence of cationic catalysts at temperatures between 0 and 100° C., preferably 50 and 90° C. (cf. for example German Auslegeschrift 1,420,283). As catalysts for this purpose there may be used protonic acids, e.g. perchloric acid, or Lewis acids, for example boron trifluoride and its complex compounds. The polymerization can take place in bulk, suspension or solution. For the removal of unstable portions it is best to subject the copolymers to a partial controlled thermal or hydrolytic degradation to the primary terminal alcohol groups (cf. German Auslegeschriften 1,445,273 and 1,445,294).

By usual heat stabilizers we mean to include for example polyamides, amides of polybasic carboxylic acids, amidines, for example dicyanodiamide, hydrazines, ureas, poly(N-vinyl-lactams) and alkaline earth metal salts of saturated or unsaturated carboxylic acids with 10 to 20, preferably 12 to 18 carbon atoms, for example the calcium salts of lauric, stearic or ricinoleic acid.

It is surprising that anthrone should be suitable as sensitizer in the production of poly(oxymethylenes) degradable under the influence of ultra-violet light since other systems containing carbonyl groups such as benzophenone (Comparative Example F) or fluorenone (Comparative Example G) also cause a quick degradation of the polymer exposed to ultra-violet light, but at the same time damage the other properties so severely that it is impossible to process such a product.

By using anthrone one achieves a considerable degree of degradation in ultra-violet light without in any way influencing the physical properties and working properties of the product. The values of thermostability and the melt indices are exactly the same as in the case of polyacetal stabilized in the normal way.

For the production of the molding composition of the invention the components are mixed thoroughly with one another in the form of powder or granules at a temperature of below 100° C., preferably between 15 and 50° C., and the mixture is subsequently homogenized in the melt. The homogenizing may take place in any mixing device, for example in roll mills, calenders, kneaders or extruders, at a temperature above the crystallite melting point of the components, i.e. at a temperature of from 150 to 250° C., preferably from 170 to 200° C. After the homogenizing the mixture is comminuted, for example granulated, rasped or pulverized, when it is still hot or already cooled down, i.e. still in the plastic or already in the solid state. Preferably, the plastic mass is granulated at a temperature of from 170 to 250° C., or it is cooled by means of an air or water bath and is then granulated.

On the one hand, the molding composition of the invention can easily be processed, but permits, on the other hand, manufacture of shaped articles with a reduced durability when exposed to ultra-violet light. The molding composition is particularly suitable for the manufacture of packing material, for example sheets, bags and sacks.

EXAMPLES

Polymer powder, stabilizer and sensitizer were thoroughly mixed at room temperature and homogenized in a single screw extruder at 200° C.

For measuring the degradation in ultra-violet light sheets of a thickness of 100 microns were put on an aluminum foil. Their brittle time was determined in a weathering apparatus (system Casella) of Messrs. Heraeus (Hanau) (see catalogue of Messrs. Quarzlampen Gesellschaft mbH (Hanau)).

In order to judge the working properties the reduced specific viscosity (RSV), the thremostability $\Delta G$ and melt index $i_2$ were determined in comparison to products stabilized as usual (Comparative Examples A to E).

The values of the reduced specific viscosity of the polymers were measured in butyrolactone containing 2% by weight of diphenylamine at a temperature of 140° C. and in a concentration of 0.5 g./100 ml.

The melt index $i_2$ was measured in accordance with DIN53,735 at a temperature of 190° C. and under a load of 2.16 kg.

The thermostability was measured by the determination of the loss of weight occurring in air at a temperature of 230° C. in the course of 2 hours.

TABLE 1
(Comparative examples)

| Number | Copolymer (percent by weight) | Stabilizer (0.1% of a mixture containing) | Sensitizer | Value $i_2$ (g./10 min.) | RSV (dl./g.) | $\Delta G$ (percent) | Brittle time (hours) |
|---|---|---|---|---|---|---|---|
| A | Trioxane (98), ethylene oxide (2). | 1 part DCD, 5 parts MBP | | 9.5 | 0.79 | 2.5 | 400 |
| B | do | 1 part calcium ricinioleate, 5 parts BDE. | | 9.2 | 0.75 | 2.3 | 440 |
| C | Formaldehyde holopolymer | do | | 10.1 | 0.80 | 4.3 | 380 |
| D | Trioxane (97), dioxolane (3) | do | | 9.8 | 0.72 | 2.7 | 410 |
| E | Trioxane (97, 95) ethylene oxide (2), butane-dioldiglycidyl ether (0.05). | do | | 7.4 | | 1.9 | 400 |
| F | Trioxane (97), dioxolane (3) | Calcium ricinoleate | 0.5% benzophenone | 20.2 | 0.3 | 41.0 | 140 |
| G | do | do | 0.5% fluorenone | 15.3 | 0.4 | 28.6 | 100 |
| H | do | do | | 12.3 | 0.8 | 35.0 | 311 |

TABLE 2
(Examples according to the invention)

| No. | Copolymer (percent by weight) | Stabilizer (0.1% of a mixture containing) | Sensitizer | Value $t_2$ (g./10 min.) | RSV (dl./g.) | ΔG (percent) | Brittle time (hours) |
|---|---|---|---|---|---|---|---|
| 1 | Trioxane (98), ethylene oxide (2). | Calcium ricinoleate | 0.5% anthrone | 9.8 | 0.75 | 1.9 | 80 |
| 2 | Formaldehyde homopolymer | do | do | 10.9 | 0.80 | 4.6 | 70 |
| 3 | Trioxane (97), dioxolane (3) | do | do | 9.3 | 0.72 | 2.9 | 60 |
| 4 | do | DCD | do | 9.4 | 0.8 | 3.0 | 60 |
| 5 | Trioxane (97, 95), ethylene oxide (2), butane-dioldiglycidyl ether (0.05). | Calcium ricinoleate | do | 8.0 | | 2.3 | 75 |

Note.—BDE=β,x'-bis[4-hydroxy-3,5-di-tert.butylphenyl]-dipropionic acid-hexane-diol-(1,6)ester; DCD=dicyanodiamide; MBP=2,2'-methylene-bis(4-methyl-6-tert.butylphenol).

What is claimed is:

1. A thermoplastic molding composition based on polyacetals, essentially consisting of a mixture of
   (a) from 99.9 to 90% by weight of an oxymethylene polymer, and
   (b) from 0.1 to 10% by weight of a mixture of from 10 to 30% by weight of a conventional heat stabilizer and from 90 to 70% by weight of anthrone.

2. A molding composition according to claim 1 containing from 0.5 to 5% by weight of the mixture of heat stabilizer and anthrone.

3. A molding composition according to claim 1 wherein the oxymethylene polymer is a copolymer of trioxane and a compound of the formula

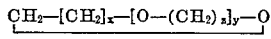

in which $x$ represents either an integer of from 1 to 3 and $y$ is zero, or in which $x$ is zero, $y$ is an integer of from 1 to 3 and $z$ is 2, or in which $x$ is zero, $y$ is 1 and $z$ is an integer of from 3 to 6.

4. A molding composition according to claim 1 wherein the oxymethylene polymer is a homopolymer of formaldehyde or trioxane.

5. A molding composition according to claim 1 wherein the heat stabilizer is a polyamide, an amide of a polybasic carboxylic acid, an amidine, a hydrazine, a urea derivative, a poly(N-vinyllactam) or an alkaline earth metal salt of a carboxylic acid or of a mixture of at least 2 of the said compounds.

6. A process for the production of a thermoplastic molding degradable in ultra-violet light, wherein 99.9 to 90 parts by weight of an oxymethylene polymer are mixed with 0.1 to 10 parts by weight of a mixture of from 10 to 30 parts by weight of a heat stabilizer and from 90 to 70 parts by weight of a light sensitizer which is anthrone, as a light sensitizer.

7. A thermoplastic molding composition consisting essentially of an oxymethylene polymer containing from 0.07 to 9% by weight of the composition of anthrone as a light sensitizer.

References Cited
UNITED STATES PATENTS 3,219,566  11/1965  Potts, Jr. et al. ___ 260—DIG. 43
3,686,142   8/1972  Heinz et al. _____ 260—45.9 P MELVYN I. MARQUIS, Primary Examiner U.S. Cl. X.R.

260—45.85 R, 45.9 P, DIG. 43